United States Patent Office 2,806,116
Patented Sept. 10, 1957

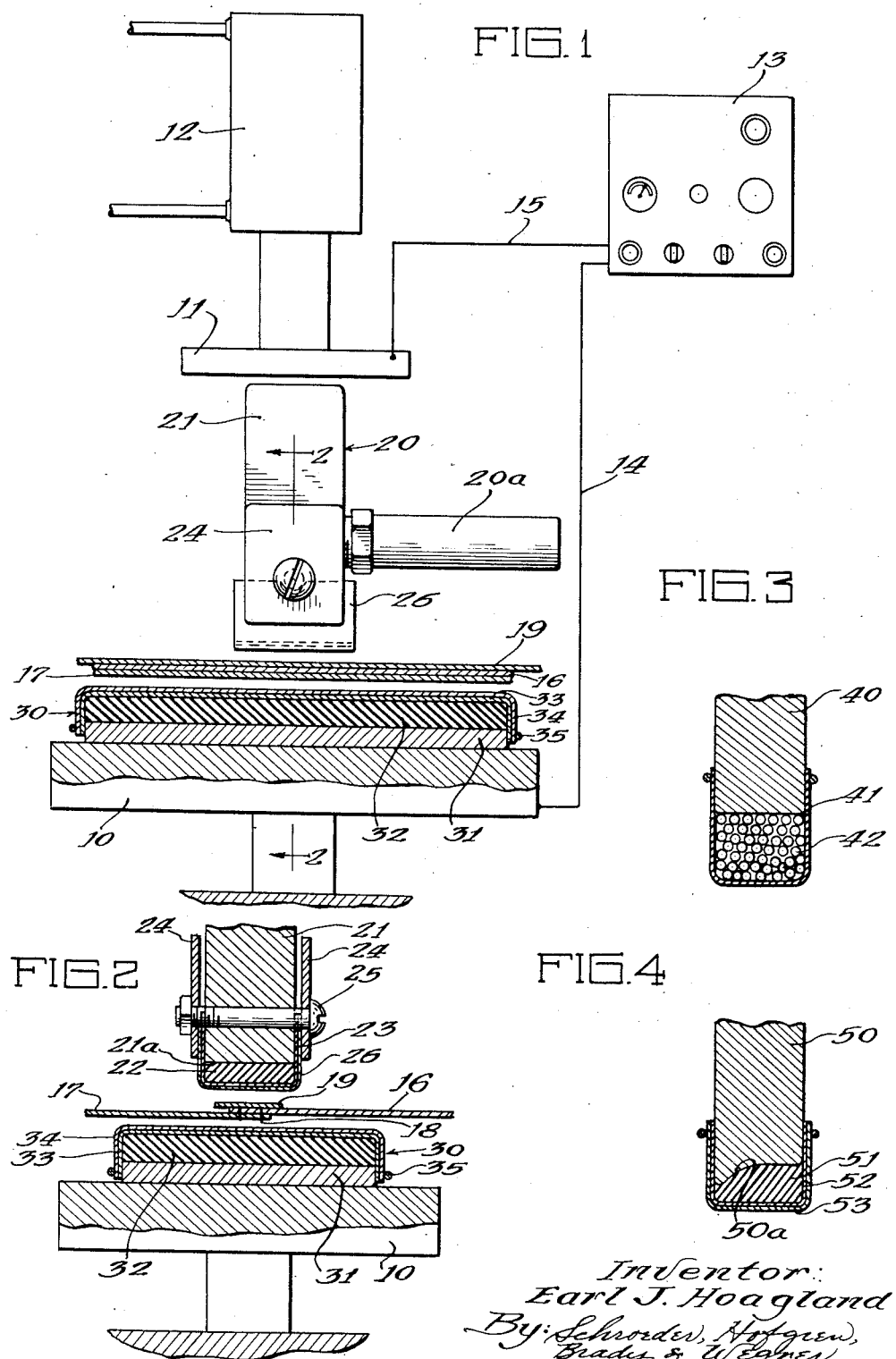

2,806,116

DIE

Earl J. Hoagland, Oak Park, Ill., assignor to Standard Safety Equipment Co., a corporation of Illinois Application November 1, 1954, Serial No. 465,825

4 Claims. (Cl. 219—10.53)

This invention relates to a die for a sealing apparatus and more particularly to a new and improved die for dielectric, heat sealing apparatus.

Heat sealing presses generally utilize rigid, highly polished die members between which the materials to be sealed are pressed. It is difficult, with such apparatus to obtain a good seal between materials of varying thickness.

The principal object of the present invention is to provide a novel die for sealing materials of varying thickness.

Another object is the provision of a die having a conformable electrically conductive portion for directing high frequency electrical energy through materials inserted between the die and a press plate.

A further object is the provision of a resilient pad between the die body and the conformable conductive portion of the die.

Another object is the provision of a flexible electrically conductive sheet overlying the resilient pad.

The invention is illustrated in a preferred embodiment and alternative embodiments in the accompanying drawings, in which:

Fig. 1 is a diagrammatic view, partially in section, of a preferred embodiment of the invention;

Fig. 2 is a fragmentary sectional view taken substantially along line 2—2 of Fig. 1;

Fig. 3 is a fragmentary vertical sectional view of a modified die; and

Fig. 4 is a fragmentary vertical sectional view of another modified die.

Dielectric heat sealing apparatus has been used for some time for sealing together synthetic plastic sheet materials. Generally, the plates of a press are connected to the terminals in an electronic generator and the material to be sealed pressed between a die member affixed to the upper press plate and the lower or base plate of the press. While the materials are held in the press the electronic generator is actuated, heating the materials as a result of the dielectric losses therein to such a temperature that the materials are fused together. The temperature used depends, of course, on the material being sealed, but for most plastics is relatively low, in the range from 40° C. to 200° C. The dies presently used with such apparatus have a rigid, straight, highly polished sealing surface and the base plates of the presses similarly are rigid. Such apparatus is satisfactory where it is desired merely to seal together two materials which are of uniform thickness.

However, where it is desired to seal materials of irregular thicknesses, it is difficult to obtain a satisfactory result with a rigid die, even by making a large number of seals, which of course is a time-consuming and expensive operation.

Referring now to Figure 1 of the drawings, a press having a rigidly mounted base plate 10 and a movable upper plate 11 is diagrammatically illustrated. Movement of upper press plate 11 is affected through the operation of a fluid pressure cylinder 12. The controls for the press do not form any part of the present invention and are not shown herein. A suitable high frequency generator 13 is provided with output leads 14 and 15, one of which is connected to the base plate 10 and the other to the movable plate 11 of the press. Electronic generators for dielectric heat sealing operations generally operate at a frequency range of 25 to 30 megacycles and may have various power ratings depending upon the particular application.

As best seen in Figure 2, the irregular materials to be sealed are here shown as two sheets 16 and 17 having their edges lapped and stitched at 18. In order to provide an impervious sheet it is necessary to seal the needle holes resulting from the stitching 18. Accordingly, it is desired to seal a narrow strip of material 19 over the lapped edges of the sheets 16 and 17.

The novel die member, indicated generally as 20, for accomplishing this comprises a rigid body 21 with a pressing surface 21a. A resilient pad 22, which may be of sponge rubber or any other conformable material is secured to the surface 21a, as by gluing. A thin sheet of flexible conductive material 23, as annealed copper, is secured over the pad 22 and the ends thereof are clamped to the rigid die body 21 by plates 24 and bolt 25. A protective cover 26 of flexible material such as Teflon, a tetrafluoroethylene plastic sold by E. I. du Pont de Nemours Co., Inc., may be secured over the conductive sheet 23 in a similar manner if so desired.

It will be apparent from an examination of this structure than when the upper press plate 11 is lowered, the die and the materials to be sealed are clamped between the plates with the desired pressure and the surface of the die conforms to the irregular contour of the materials, providing pressure thereon across the width of the strip 19 and the seam between the sheets 16 and 17. The conductive sheet 23 provides the necessary electrical path for the high frequency heating current immediately adjacent the materials being sealed. The resulting seal is fused throughout the width of strip 19 notwithstanding the irregularities of the various materials.

While the resilient die just described may be used satisfactorily with a rigid base plate, it is in some instances desirable to provide an auxiliary, conformable base plate 30 comprising a rigid plate 31 having secured thereto a resilient pad 32. As in the case of the die, a sheet of thin flexible conductive material 33 and a protective cover 34 are secured over pad 32 by a retaining band 35, the conductive sheet 33 again providing the necessary electrical connection.

It has been found that the resilient die arrangement just described operates satisfactorily with various types of thermally sealed materials, as for example vinyl chloride and polyethylene. It is particularly well adapted for sealing the seams in protective clothing made of plastic-coated fabrics, eliminating imperfections in such sealed seams.

Referring now to Figure 3 of the drawings, a modified form of die is illustrated in which a rigid die member 40 has secured to the end thereof a cup 41, of a flexible sheet material, as Teflon, and which contains a quantity of metallic granules 42. The granules being loose, readily conform to the configuration of the material being sealed when subjected to the pressure of the press. Zinc dust and copper or aluminum powders have been found to work satisfactorily.

A further modification of the die is illustrated in Figure 4 where a rigid die member 50 has a surface 50a shaped to conform roughly to the irregularities of the materials to be sealed. A resilient pad 51 is secured to the die face 50a and is provided with a conductive sheath 52 and a protective cover 53, as discussed previously. A die of this type is particularly advantageous in that the pressure may be distributed equally on the materials being sealed regardless of the irregularity thereof.

It should be noted in Figure 1 that the die 20 itself is completely independent of the upper press plate 11 and is provided with a handle 20a by which it may be positioned on the materials to be sealed. It is the usual practice to attach the die member rigidly to the upper press plate and utilize a fixture arrangement to position the materials. With the die of this invention the material is merely placed between the plates 10 and 11 of the press and die member 20 manually positioned as desired thereon.

The foregoing detailed description is given for clearness of understanding only and no unnecessary limitations should be understood therefrom, for some modifications will be obvious to those skilled in the art.

I claim:

1. In a dielectric heat sealing apparatus including a press having plates movable toward and away from each other and a source of high frequency electrical energy, a die for use in sealing materials of irregular thickness comprising a rigid die body, a freely conformable electrically conductive portion for directing high frequency electrical energy through materials inserted between said die and one of the press plates, and a resilient pad of sponge rubber between said die body and the conformable electrically conductive portion.

2. A die as specified in claim 1, wherein a thin flexible electrically conductive sheet is secured over said resilient pad.

3. In a dielectric heat sealing apparatus including a press having plates movable toward and away from each other and a source of high frequency electrical energy connected to said plates, a die for use in sealing materials of irregular thickness comprising a rigid, electrically conductive die body having a conformable, material-engaging portion including a resilient pad of sponge rubber secured to said body and a thin, flexible, electrically conductive sheet overlying the pad and having a portion in conductive contact with said body.

4. In a dielectric heat sealing apparatus including a press having plates movable toward and away from each other and a source of high frequency electrical energy, a die and a base plate for use in sealing materials of irregular thickness, both said die and said base plate having a freely conformable, resilient, electrically conductive portion, including a pad of sponge rubber, the surface of each portion engaging the materials being sealed.

References Cited in the file of this patent

UNITED STATES PATENTS

| | | |
|---|---|---|
| 2,459,260 | Brown | Jan. 18, 1949 |
| 2,579,896 | Ashley | Dec. 25, 1951 |
| 2,623,984 | Ashley | Dec. 30, 1952 |
| 2,706,233 | Yamaguchi | Apr. 12, 1955 |

FOREIGN PATENTS

| | | |
|---|---|---|
| 624,329 | Great Britain | June 2, 1949 |